United States Patent Office 3,537,309
Patented Nov. 3, 1970

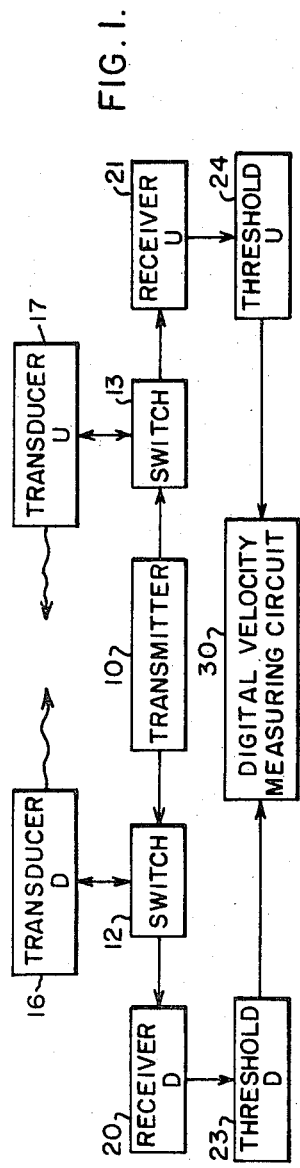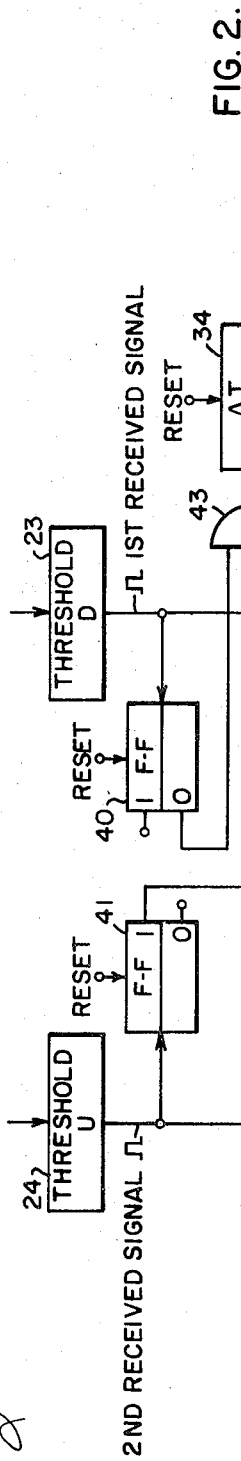

3,537,309
FLUID VELOCITY MEASURING SYSTEM
Kenneth P. Geohegan, Jr., Donald W. Hunt, and Glenn P. Erickson, Baltimore, Md., assignors to Westinghouse Electric Corporation, Pittsburgh, Pa., a corporation of Pennsylvania
Filed Nov. 26, 1968, Ser. No. 779,055
Int. Cl. G01p 5/00
U.S. Cl. 73—194                     6 Claims

ABSTRACT OF THE DISCLOSURE

An upstream and downstream transducer station transmit acoustic energy towards one another through the fluid under measurement and an indication of $\Delta T$, the difference in the time arrival of the acoustic energy at the opposed transducer stations is obtained. To correct for variations in the speed of sound in the fluid under measurement, a nominally correct speed of sound is chosen and a signal is generated indicative of the acoustic energy transit time in the absence of fluid flow and with the assumed speed of sound. The signal is compared with the time occurrence of the actual receipt of acoustic energy at the transducer stations and an error signal is generated which is effectively added to or subtracted from the value indicative of the nominal speed of sound, and the result is combined with $\Delta T$ to obtain true velocity.

BACKGROUND OF THE INVENTION

Field of the invention

The invention in general relates to flowmeter apparatus for measuring fluid velocity and more particularly to a system for accurately compensating for the changes in speed of sound in the fluid under measurement.

Description of the prior art

Various flowmeter systems include an upstream transducer station and a downstream transducer station communicative with the fluid under measurement, and wherein acoustic energy is simultaneously transmitted to both the transducer stations during periodic transmission cyles. In the absence of fluid flow, the time it takes for the acoustic energy to travel from the source of acoustic energy to the downstream transducer station is $T_D = L_D/C$ where $T_D$ is the time, $L_D$ is the distance from acoustic energy source to the downstream transducer station and $C$ is the speed of sound in the fluid. Similarly, the time it takes for the acoustic energy to travel to the upstream transducer is $T_U = L_U/C$ where $L_U$ is the distance between the acoustic energy source and upstream transducer station, and $C$ is the speed of sound in the fluid. For accuracy and convenience, the upstream and downstream transducer stations also act as transmitters and simultaneously project the acoustic energy towards one another so that in both cases, the distances are the same and may be designated as $L$.

If a downstream velocity is now imparted to the fluid, acoustic energy traveling downstream will be aided by the velocity and acoustic energy traveling upstream will be retarded by the velocity and the above equations are modified so that $$T_D = \frac{L}{C+V}$$

and $$T_U = \frac{L}{C-V}$$

where $V$ is the velocity of the fluid.

The difference in acoustic travel time upstream and downstream is $$T_U - T_D = \Delta T = \frac{2LV}{C^2 - V^2}$$

and since $C^2$ is in practice much larger than $V^2$ the equation reduces $\Delta T = 2LV/C^2$. With a known $L$ and a known $C$ therefore it is seen that the velocity $V$ of the fluid is proportional to the difference in transit times $\Delta T$ of the upstream and downstream acoustic energy. A problem arises however in that the speed of sound, in actuality, is not constant but varies with the mineral content and temperature of the fluid being measured and therefore in such flowmeter systems means are provided to compensate for the varying speed of sound.

One type of compensating scheme utilizes a variable frequency oscillator (VFO) which provides its output signal during a transmission cycle to a time interval counter for a period of time commencing with the reception of acoustic energy by the downstream transducer station and terminating with the reception of energy by the upstream transducer station, with the count in the time interval counter being indicative of $\Delta T$. The frequency of the VFO is varied by a VFO analog control circuit. In an Nth transmission cycle there is obtained an indication of ½ $\Delta T$ for the purpose of controlling the VFO in a subsequent, such as the Nth+1 transmission cycle.

In systems with sufficiently high sample rates the utilization of information from a previous transmission cycle represents a very minor error; however in systems with a low transmission rate this method could contribute a considerable error. Relatively low transmission rates are utilized in flowmeter systems where the transducer stations are separated by a great distance, and in some instances the separation may be close to 2000 feet. In addition, where digital circuitry is utilized, the provision of an analog correction circuit for the VFO often creates noise and introduces some error.

It is therefore a primary object of the present invention to provide a highly accurate fluid velocity measuring system which corrects for the speed of sound in the fluid under measurement during each transmission cycle.

It is a further object of the present invention to provide such a system which eliminates the need for analog circuitry.

It is a further object of the present invention to provide a system which allows transducer stations of flowmeter apparatus to be spaced at great distances from one another in a fluid conveyance.

SUMMARY OF THE INVENTION

Acoustic energy is projected through a fluid under measurement towards respective upstream and downstream transducer stations and in response to the receipt of acoustic energy thereat, respective first and second received pulses, or signals are provided, the difference in time occurrence of the respective received signals being indicative of fluid velocity. A first circuit means is responsive to the first and second received signals for providing a first signal indicative of $\Delta T$ during a transmission cycle. During that particular transmission cycle a second circuit means provides a second signal indicative of the time occurrence of a received signal in the absence of fluid velocity and with an assumed correct speed of sound. A third circuit means generates a third signal which is an error signal $\Delta C$ indicative of the difference in time occurrence $\Delta \tau$ of the second output signal and one of the first or second received signals. A fourth circuit means provides a fourth signal indicative of the assumed correct speed of sound and the first, third and fourth signals are combined in circuitry and modified by predetermined constants to provide an output signal, which output signal is the desired velocity.

BRIEF DESCRIPTION OF THE DRAWINGS

FIG. 1 illustrates, in block diagram form, a typical fluid velocity measuring system in which the present invention may be used;

FIG. 2 is a block diagram illustrating one embodiment of the present invention;

DESCRIPTION OF THE PREFERRED EMBODIMENT

Figure 3:
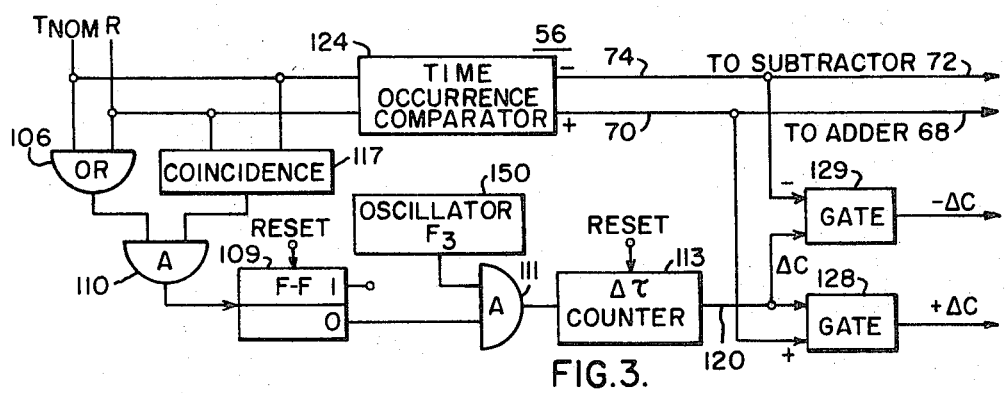
FIG. 3 is a block diagram illustrating the $\Delta C$ generator of FIG. 2 in more detail.

Referring now to a typical flowmeter system as illustrated in FIG. 1 there is provided a transmitter 10, which, during periodic transmission cycles, supplies electrical energy through switches 12 and 13 to downstream and upstream transducer stations 16 and 17 respectively. For convenience and to enhance accuracy each transducer station may comprise only one transducer which is operable to send an acoustic signal to its opposing transducer and will provide a corresponding output signal when acoustic energy impinges upon the transducer. The acoustic energy received by the downstream transducer 16 is conducted through switch 12 to receiver 20 and the signal provided by transducer 17 as a result of the acoustic energy produced by transducer 16 is conducted through switch 13 to receiver 21. Threshold devices 23 and 24 are responsive to the output of the receivers 20 and 21, respectively, for providing pulses herein termed received signals, indicative of the difference in travel time of the acoustic energy provided by transducers 16 and 17.

In the absence of fluid velocity the acoustic energy provided by transducer 16 arrives at transducer 17 at the same time that the acoustic energy provided by transducer 17 arrives at transducer 16 and therefore the first and second received pulses provided by threshold devices 23 and 24 occur simultaneously. With a velocity imparted to the fluid under measurement (in an upstream to downstream direction) the acoustic signal will arrive at transducer 16 first since it is aided by the fluid velocity and the acoustic signal will arrive at transducer 17 at a later point in time since it is retarded by the fluid velocity and therefore threshold device 23 will provide a first received signal and threshold device 24 will provide a second received signal thereafter, the difference in time occurrence between the first and second received signals being indicative of the fluid velocity in accordance with the previously given equation $$T_\text{U} - T_\text{D} = \Delta T = \frac{2LV}{C^2}$$

Velocity measuring circuits generally designated 30 are provided and utilize the first and second received signals in the computation of fluid velocity.

In FIG. 2, a first circuit means is responsive to the first and second received signals for providing a first signal indicative of the difference in time occurrence $\Delta T$ of the first and second received signals during a transmission cycle. The first circuit means includes a $\Delta T$ counter 34 operative to count up output pulses provided by a constant frequency stable oscillator 36 having a frequency designated $F_1$. Prior to a transmission cycle, the $\Delta T$ counter 34 is reset and flip-flops 40 and 41 are reset to the respective opposite binary states shown so that the zero signal provided by flip-flop 40 blocks AND gate 43. Upon the occurrence of the first received signal, flip-flop 40 switches to a one state to enable AND gate 43 such that the output of constant frequency stable oscillator 36 is fed to the $\Delta T$ counter 34. Upon the occurrence of the second received signal, flip-flop 41 switches to its zero state such that AND gate 43 is again blocked whereupon the output of oscillator 36 is no longer counted, and the $\Delta T$ counter 34 shuts off, with the count in the counter being indicative of the difference in time occurrence between the first and second received pulses.

The $\Delta T$ counter 34 may be the type which includes a plurality of interconnected flip-flops collectively operable to count in the binary number system upon the successive application of input pulse to the $\Delta T$ counter 34. The $\Delta T$ counter 34 output herein termed the first output signal, is available as a binary number for further processing on output lead means 45. Prior to a next transmission cycle the flip-flops 40 and 41 will be reset by the provision of a reset signal.

In operation, an assumed correct speed of sound is chosen. This nominal speed of sound, that is correct in name only, is herein designated $C_\text{NOM}$. Second circuit means are provided herein for generating, during periodic transmission cycles an output signal at a time $T_\text{NOM} = L/C_\text{NOM}$ where $T_\text{NOM}$ is the time it takes for acoustic energy to travel over a path L through the fluid under measurement in the absence of fluid velocity and with an assumed correct speed of sound $C_\text{NOM}$. The second circuit means includes a $T_\text{NOM}$ generator 48 which is initially reset by provision of a reset signal and which is operable to receive and count up the output signal of a second constant frequency stable oscillator 50 having a frequency of $F_2$. By way of example, the $T_\text{NOM}$ generator 48 may be a counter comprised of a plurality of flip-flops with gating means arranged such that when the counter attains a predetermined count, an output signal will be provided on output lead means 52 and is herein termed the second output signal ($T_\text{NOM}$).

Third circuit means is provided for generating a third signal, an error signal $\Delta C$ indicative of the difference in time occurence $\Delta \tau$ of $T_\text{NOM}$ and one of the first or second received signals. The generation of error signal is accomplished by means of the $\Delta C$ generator 56.

It has been stated that the actual speed of sound C, in the fluid under measurement is not in reality a constant and accordingly a velocity determination based upon a constant C term in the equation $V = \Delta TC^2/2L$ will be in error. Operation of the apparatus disclosed herein is based upon the precept that actual sound velocity $C = C_\text{NOM} \pm \Delta C$, where $\Delta C$ is the difference between the nominal sound velocity and the actual sound velocity. The $C^2$ term in the velocity equation $$V = \Delta TC^2/2L$$

would then be represented by the expression:

$$C^2 = C^2_\text{NOM} \pm 2\Delta C \times C_\text{NOM} + \Delta C^2$$

$\Delta C^2$ is much smaller than $C^2_\text{NOM}$ and with little error the $C^2$ equation may be represented as $$C^2 = C_\text{NOM}(C_\text{NOM} \pm 2\Delta C)$$

To obtain a correct representation for the term $C^2$ in the velocity equation there is needed a representation of $C_\text{NOM}$. Fourth circuit means in the form of $C_\text{NOM}$ generator 60 provides a fourth signal indicative of $C_\text{NOM}$ and by way of example the output of the $C_\text{NOM}$ generator may be a presettable fixed binary number provided by circuitry well known to those skilled in the art and which number remains unchanged throughout the flowmeter operation, until such time as a new $C_\text{NOM}$ is decided upon.

A fifth circuit means combines the various output signals to derive a velocity indication. The proper combining of the various output signals to derive an indication of velocity may be implemented in any number of ways well known to those skilled in the art of digital processing.

FIG. 2 functionally illustrates one method by which a velocity output signal may be derived.

In the expression for $C^2$, the error signal $\Delta C$ is multiplied by a factor of 2. Accordingly, multiplication circuits 63 and 64 are responsive to the $\Delta C$ output signal provided by the $\Delta C$ generator 56 to multiply the signal to obtain a value $+2\Delta C$ for multiplication circuit 63 or $-2\Delta C$ for multiplication circuit 64 depending upon whether $T_{NOM}$ occurs at a point in time after the first or second received signal or whether it occurs before the first or second received signal. If $T_{NOM}$ occurs after the first or second received pulse the error signal $+2\Delta C$ is provided to adder circuit 68 which receives an enabling signal on the positive lead 70 from the $\Delta C$ generator 56. If $T_{NOM}$ occurs before the first and second received signal the error signal $-2\Delta C$ is provided to a subtractor circuit 72 which additionally receives an enabling signal on negative lead 74.

The number in the $C_{NOM}$ generator 60 is provided to a C register 77 which in turn provides the $C_{NOM}$ number by output lead means 79 to both the adder 68 and subtractor 72 which will respectively perform an addition or subtraction of the signal indicative of $C_{NOM}$ with $2\Delta C$, the result being returned to the C register by respective output lead means 81 and 82. The result of the addition or subtraction is provided via output lead means 85 to a multiplication circuit 87 which would then multiply that value supplied by the value of $C_{NOM}$ provided by the $C_{NOM}$ register 60. The output of the multiplication circuit 87 is then representative of $C^2$. This $C^2$ value (i.e. $C^2 = C_{NOM}(C_{NOM} \pm 2\Delta C)$) is multiplied by the signal indicative of $\Delta T$ in multiplication circuit 89. Since the signal indicative of $\Delta T$ is in actuality a number of counts, and since the transducer stations 16 and 17 generally project acoustic energy towards one another at a certain angle, with respect to fluid flow direction, there is generally involved some proportionality constant which also takes into account the 2L term. This proportionality constant is included in the multiplication process such that the output of multiplication circuit 89 is the desired velocity. The velocity reading may be averaged over several cycles in averaging circuit 91 and the results provided to an output means 93.

It has been stated that the $T_{NOM}$ signal is time compared with the first or second received signals. In a preferred embodiment the $T_{NOM}$ signal during one transmission is compared with the first received signal and then is compared with the second received signal during a latter, preferably the subsequent transmission cycle. This is accomplished by the provision of a 6th circuit means which includes two AND gates 96 and 97 which respectively are operable to receive the first and second received signals. The second input to each of the AND gates 96 and 97 is provided by respective outputs of a flip-flop device 99. Flip-flop 99 is initially reset to the binary states shown by the provision of a reset signal. Flip-flop 99 is of the type which upon the occurrence of, for example, the leading edge of successive square wave input pulses on input 100 will alternately switch its output states. An output pulse on input 100 may be provided at the commencement of each transmission cycle, such input pulse being designated TR.

As illustrated in FIG. 2, with the binary states shown, AND gate 96 receiving a one input signal is enabled whereas AND gate 97 receives a zero input signal and is blocked. When the first received signal occurs, AND gate 96 will provide an output signal to the $\Delta C$ generator 56 by means of OR gate 104 the output of which is representative of a received signal, and designated R. At the beginning of the next transmission cycle a TR pulse is provided on input 100 flip-flop 99 to switch the binary states shown such that AND gate 97 will be enabled. Since AND gate 96 is not enabled it will not provide an output signal upon the occurrence of the first received signal whereas AND gate 97 will provide an output signal upon the occurrence of the second received signal.

The error signal $\Delta C$ may be generated by various methods and may be represented by various signals such as a pulse width (a time indication) or a binary number (a numerical indication). FIG. 3 illustrates by way of example one arrangement which provides a numerical indication.

The $\Delta C$ generator 56 as illustrated in FIG. 3 includes an OR gate 106 operative to receive the $T_{NOM}$ signal from $T_{NOM}$ generator 48 (FIG. 2) and the R signal indicative of a received signal, from OR gate 104 (FIG. 2) in order to provide flip-flop device 109 with input signals by way of AND gate 110. Flip-flop 109 may be of the same type as flip-flop 99 except for the fact that only one output lead is utilized. The flip-flop 109 may be initially set to the state illustrated by means of a reset signal such that a zero signal is provided to an AND gate 111. A $\Delta\tau$ counter 113, resettable by reset signal, is operable to count up the output of a third constant frequency stable oscillator 115 providing an output signal of frequency $F_3$, to AND gate 111. When a $T_{NOM}$ or R signal is received, the flip-flop 109 will provide an enabling signal to AND gate 111 whereby the counter 113 commences its counting function. When the other of the $T_{NOM}$ or R signals is received, OR gate 106 passes a signal which switches flip-flop 109 to its opposite state as shown, whereby the $\Delta\tau$ counter 113 ceases its counting function. If the $T_{NOM}$ signal occurs simultaneously with the R signal, the simultaneous occurrence will be detected by a coincident circuit 117 which will then remove its normally provided enabling signal from AND gate 110. Flip-flop 109 will remain in the state shown and the $\Delta\tau$ counter 113 will have a count of zero indicating that the actual speed of sound is almost equal to the assumed speed of sound. During the next transmission cycle however a small error signal $\Delta C$ will be provided by the $\Delta\tau$ counter 113 on output lead means 120 since $T_{NOM}$ will be compared with the other of the received signals. When there is no coincidence between the $T_{NOM}$ and R signals coincident circuit 117 provides its enabling signal to AND gate 110 and an error signal $\Delta C$ is generated.

If the actual sound velocity is less than the nominal sound velocity $T_{NOM}$ will occur first, and $\Delta C$ must be substracted whereas if the actual sound velocity is greater than the nominal sound velocity R will occur first and $\Delta C$ must be added. In order to determine which of the two signals, $T_{NOM}$ or R occur first, there is provided a time occurrence comparator 124 which will provide a signal on positive lead 70 if R occurs first and will provide a signal on negative lead 74 if $T_{NOM}$ occurs first.

The error signal $\Delta C$ is supplied to gating means 128 and 129 which additionally receive the output from the time occurrence comparator 124 such that if the R signal occurs first, gating means 128 will provide the output error signal which is supplied to the multiplier circuit 63 of FIG. 2 and if $T_{NOM}$ occurs first gating means 129 will supply the error signal $\Delta C$ to the multiplier circuit 64 of FIG. 2.

Figure 4:
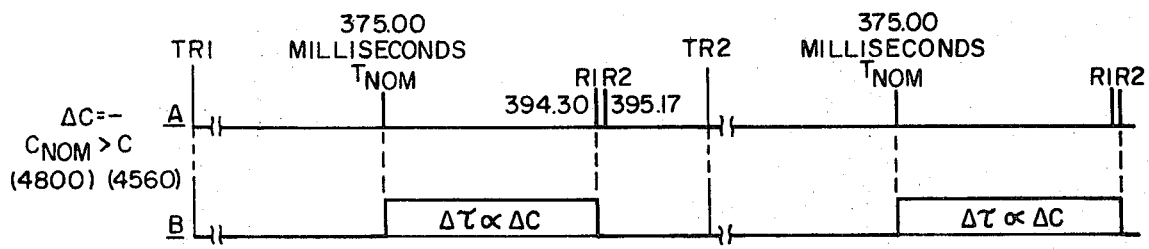
FIGS. 4A–B to 6A–B are timing diagrams and waveforms to aid in an understanding of the operation of FIG. 2.

The time occurrence of various signals for different actual speeds of sound C is illustrated in FIGS. 4A–B to 6A–B, to which reference is now made. By way of example let it be assumed that in a typical application the spacing of the transducer station 16 and 17 (FIG. 1) is in the order of 1800 feet and the assumed correct speed of sound $C_{NOM}$ is 4800 feet per second. The actual speed of sound may vary from this $C_{NOM}$ by, for example, as much as 5% such that the actual C may range from 4560 feet per second to 5040 feet per second. FIG. 4A illustrates a timing sequence for two transmission cycles for the situation where the actual speed of sound is 4560 feet per second. At time TR1 an acoustic transmission takes place and at some time later $T_{NOM}$ occurs. With an L of 1800 feet and a $C_{NOM}$ of 4800 feet per second $T_{NOM}$ occurs 375.00 milliseconds after transmission. Assuming that the fluid under measurement has a velocity of 5 feet per second, the first received signal R1 will occur at a time $$T = \frac{L}{C+V}$$

or 394.30 milliseconds after transmission and the second received signal R2 will occur at a time $$T = \frac{L}{C-V}$$

or 395.17 milliseconds after transmission.

Upon the occurrence of $T_{NOM}$ the $\Delta\tau$ generator 113 of FIG. 3 commences counting and with the AND gate 96 of FIG. 2 enabled by flip-flop 99 the first received pulse R1 will be chosen such that the $\Delta\tau$ counter 113 will count up the output of oscillator 150 until the first received signal terminates the counting, as previously explained. The count in the $\Delta\tau$ counter 113 therefore is indicative of the error $\Delta C (\Delta\tau \propto \Delta C)$. After the reception of the received signal R1 or R2, the multiplication, addition or subtraction, and transfer of signals takes place by the circuitry described in FIG. 2 prior to the second transmission indicated at time TR2, 375.00 milliseconds after which, $T_{NOM}$ occurs. For the second transmission flip-flop 99 of FIG. 2 will have switched states such that AND gate 97 will be enabled to pass the second received signal which governs the shutting off of the $\Delta\tau$ counter 113 of FIG. 3.

FIG. 4B illustrates that during the first transmission cycle, $\Delta\tau$ is measured from a time beginning with the occurrence of $T_{NOM}$ and terminates with the provision of R1, whereas in the second transmission cycle termination occurs with R2. By alternately choosing the first and second received signals, the width of the $\Delta\tau$ curve of FIG. 4B is averaged to begin at the occurrence of $T_{NOM}$ and terminate at a time exactly midway between R1 and R2. On a time scale, the distance between R1 and R2 is 0.87 millisecond whereas the width of the $\Delta\tau$ signal is, for the first transmission cycle, 19.30 milliseconds. Accordingly, the frequency of F1 of oscillator 36 (FIG. 2) may be chosen to be much greater than the frequency F3 of oscillator 150 (FIG. 3).

Figure 5:
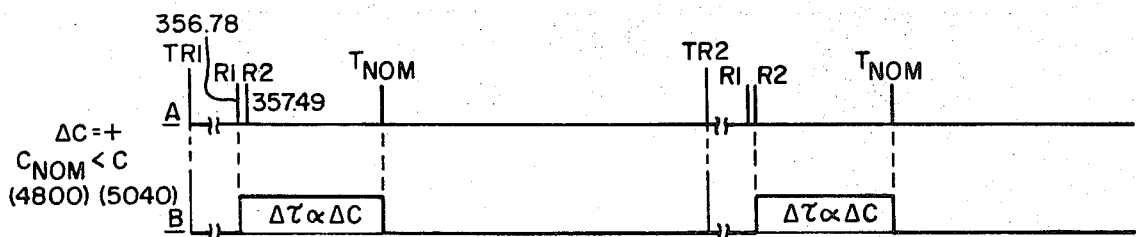

In FIG. 5A for an actual speed of sound of 5040 feet per second the received signal R1 occurs at 356.78 milliseconds after transmission and R2 occurs at 357.49 milliseconds after transmission, both received signals occurring before $T_{NOM}$ which is again provided at 375.00 milliseconds after transmission. FIG. 5B illustrates the error signal commencing with the first received signal and terminating with $T_{NOM}$ in the first transmission cycle, and commencing with the second received signal R2 and terminating with $T_{NOM}$ in the second transmission cycle.

Figure 6:
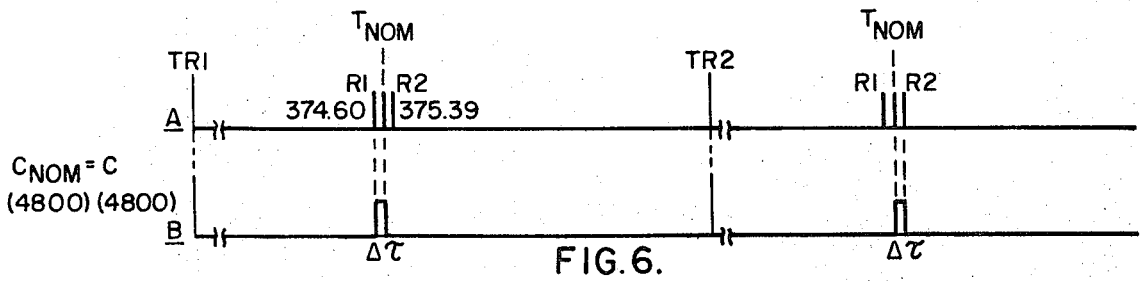

In FIG. 6A the actual speed of sound is identical with $C_{NOM}$ and $T_{NOM}$ occurs midway between the first received signal R1 and second received signal R2 these signals being provided at respective times of 374.60 and 375.39 milliseconds after transmission. A small positive error signal as illustrated in FIG. 6B is generated during the first transmission cycle whereas a small negative error signal is generated during the second transmission cycle and since the magnitude of the error signal is identical in both cases, the averaging process of FIG. 2 will effectively indicate zero error.

Although the present invention has been described with a certain degree of particularity, it should be understood that the present disclosure has been made by way of example and that modifications and variations of the present invention are made possible in the light of the above teachings.

What is claimed is:

1. In a fluid velocity measuring system, including first and second opposed transducer stations, and which operates in periodic transmission cycles wherein during each transmission cycle acoustic energy is propagated through the fluid under measurement toward the opposed transducer stations which upon receipt of the acoustic energy provide respective first and second received signals, the difference in time occurrence of the respective received signals being indicative of fluid velocity, the improvement comprising in combination:
   (a) first circuit means responsive to the first and second received signals for providing a first signal indicative of the difference in time occurrence $\Delta T$ of the first and second received signals, during a transmission cycle;
   (b) second circuit means for providing, during transmission cycles, a second signal at a time indicative of $T_{NOM}$, where $T_{NOM} = L/C_{NOM}$, L is the distance between the source of acoustic energy and a transducer station, and $C_{NOM}$ is a fixed assumed correct speed of sound in the fluid under measurement,
   (c) third circuit means for generating a third signal $\Delta C$ indicative of the difference in time occurrence $\Delta\tau$ of said second signal $T_{NOM}$ and one of said first or second received signals;
   (d) fourth circuit means for providing a fourth signal indicative of $C_{NOM}$, and
   (e) fifth circuit means for combining, and modifying by a predetermined factor, said first, third and fourth signals for providing an output signal.

2. Apparatus according to claim 1 wherein the first circuit means includes:
   (a) a stable oscillator for providing a constant frequency output signal F1;
   (b) a $\Delta T$ counter operable to count up the cycles of said constant frequency output signal and
   (c) gating means responsive to the first and second received signals for gating said constant frequency output signal to said $\Delta T$ counter, for a time interval, commencing with the first, and terminating with the second, received signal.

3. Apparatus according to claim 1 which includes
   (a) sixth circuit means for alternately passing said first and second received signals on alternate transmission cycles, for time comparison with the second signal, $T_{NOM}$.

4. Apparatus according to claim 1 wherein the third circuit means includes:
   (a) a stable oscillator for providing a constant frequency output signal $F_2$;
   (b) counter means operable to count up the cycles of said constant frequency output signal and provide an output signal, when a pre-calculated count has been attained.

5. Apparatus according to claim 1 wherein the fourth circuit means includes:
   (a) means presettable to a desired binary number indicative of $C_{NOM}$.

6. Apparatus according to claim 1 wherein the fifth circuit means includes:
   (a) adder means operable during a transmission cycle if the second signal occurs after the first received signal;
   (b) subtractor means operable during a transmission cycle if the second signal occurs before the first received signal;
   (c) circuit means for selectively adding or subtracting an indication of $\Delta C$ to or from the fourth signal indicative of $C_{NOM}$.

References Cited

UNITED STATES PATENTS

| | | | |
|---|---|---|---|
| 2,959,054 | 11/1960 | Welkowitz | 73—194 |
| 3,336,801 | 8/1967 | Snavely | 73—194 XR |
| 3,402,606 | 9/1968 | Bruha | 73—194 |
| 3,440,876 | 4/1969 | Hayes et al. | 73—194 |

CHARLES A. RUEHL, Primary Examiner